Jan. 24, 1950     C. E. STROBURG     2,495,430
BRUSH MOVING DEVICE FOR GENERATORS
Filed April 29, 1948
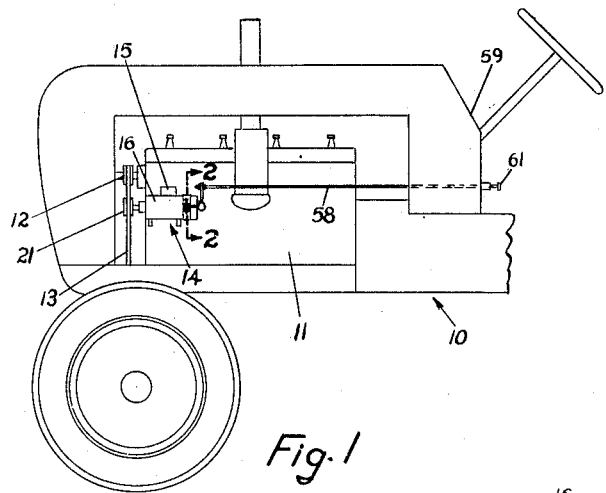
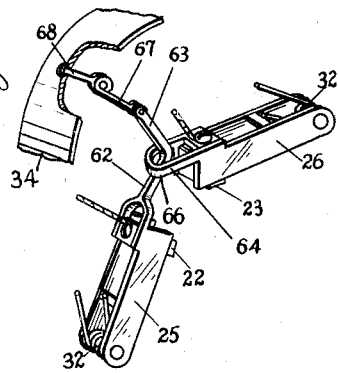
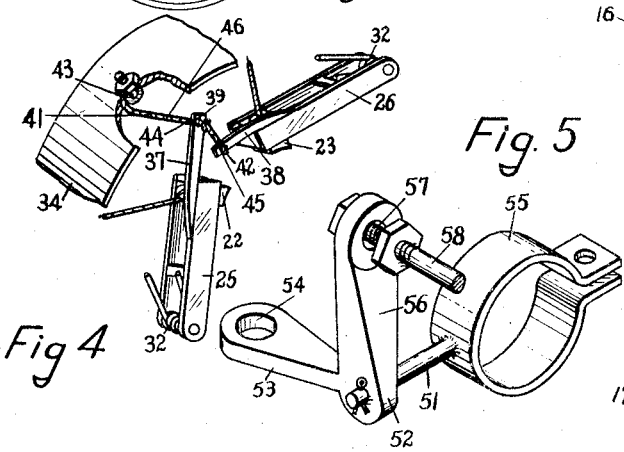
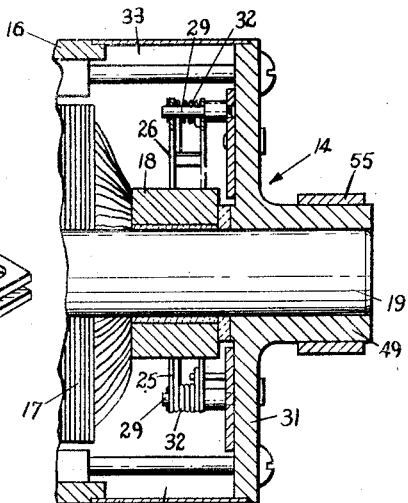
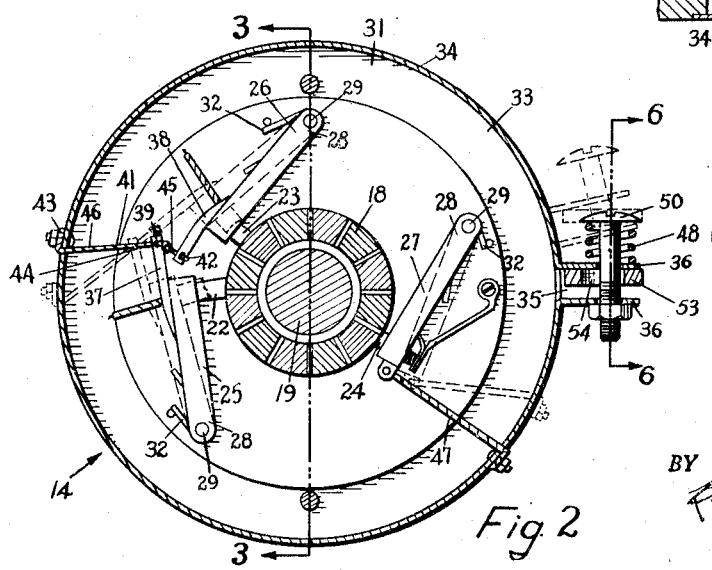
INVENTOR.
Clark E. Stroburg
BY Rudolph L. Lowell
Atty.

Patented Jan. 24, 1950

2,495,430

UNITED STATES PATENT OFFICE 2,495,430

BRUSH MOVING DEVICE FOR GENERATORS

Clark E. Stroburg, Blockton, Iowa

Application April 29, 1948, Serial No. 23,970

4 Claims. (Cl. 171—324)

This invention relates generally to generators for charging vehicle batteries and in particular to a generator brush-removing device for positively controlling the output of the generator to the battery.

Many farm tractors now in use are equipped with batteries for engine starting and for lights during night operation. Generators for charging these batteries are usually driven directly from the tractor engine and often times are provided with cut-outs. During farming seasons it is not uncommon to have tractors operate continuously over long periods each day. Since the drain on the battery occurs primarily only on engine starting and for lights during night operation, the battery is seldom run down. In other words, the drain on the tractor battery during farm seasons is relatively light so that the life of the battery is shortened more as a result of overcharging than by any drain on the battery during either farming or winter seasons. Further, the usual voltage cut-outs on the generators are generally unsatisfactory to prevent this overcharging condition.

It is an object of this invention, therefore, to provide a positive cut-out for the battery generator.

A further object of this invention is to provide a device for concurrently moving and holding all of the commutator brushes out of engagement with the generator commutator when the battery is in a charged condition.

Another object of this invention is to provide a device for a tractor battery generator by which the battery charging periods of the generator are capable of being positively controlled by the tractor operator.

A further object of this invention is to provide a device for concurrently moving all of the commutator brushes in a vehicle generator into and out of contact engagement with the commutator, which is of a simple construction and capable of being readily applied to most types of tractor generators now in use.

A feature of this invention is found in the provision for a vehicle generator having a pair of adjacent pivoted brush supports pivotally movable in opposite directions away from the generator commutator, of a device for concurrently moving the commutator brushes into and out of engagement with the commutator in which an actuating member is supported on the generator housing for rocking or rotational movement in an arcuate path concentric with the commutator and spaced from the brush supports. The adjacent free ends of the brush supports are movably connected together such that one of the supports is pivotally moved away from the commutator in response to a pivoted movement of the second brush support away from the commutator. In turn the second brush is movably connected with the actuating member so as to be pivotally moved in response to a rocking movement of the actuating member. The actuating member may be manipulated directly or by means connected therewith and operable from the vehicle instrument panel.

Further objects, features and advantages of this invention will become apparent from the following description when taken in connection with the accompanying drawings, in which:

Fig. 1 is a side elevational view of the front end portion of a farm tractor showing the brush moving device of this invention in assembly relation with the engine generator;

Fig. 2 is an enlarged transverse sectional detail view through the commutator end of the generator, taken substantially on the line 2—2 in Fig. 1;

Fig. 3 is a fragmentary longitudinal sectional view of the commutator end of the generator as seen along the lines 3—3 in Fig. 2;

Fig. 4 is a detail fragmentary perspective view of the brush moving device shown in Figs. 2 and 3;

Fig. 5 is a fragmentary detail perspective view of a manually operated unit for actuating the brush moving device of this invention;

Fig. 6 is a sectional view taken on the line 6—6 in Fig. 2; and

Fig. 7 is a detail fragmentary perspective view of a modified form of the invention.

With reference to the drawings, the invention is illustrated in Fig. 1 in assembly relation with a usual type farm tractor 10 having an engine 11 equipped with a water pump and fan drive pulley 12 driven directly from the engine 11 through a belt 13. A generator, indicated generally at 14, is adapted to charge a battery (not shown) carried on the tractor and electrically connected with the generator in a well known manner.

The generator is of a commercially available type equipped with a cutout 15, and includes a housing 16 (Figs. 1 and 3) for an armature 17 provided at one end with a commutator 18. The armature shaft 19 is rotatably supported in opposite ends of the generator housing 16. A pulley 21 on the armature shaft is driven from the belt 13 so that the generator is in a direct driven relation with the tractor engine.

At its commutator end the generator 14 has three commutator brushes 22, 23 and 24, with the brushes 22 and 23 being adjacent to each other. Like brush supports 25, 26 and 27, for the brushes 22, 23 and 24, respectively, have one of their ends 28 carried on pivots 29 extended inwardly from the housing end wall 31 in an angularly spaced relation about the commutator 18. The brush supports 25 and 26, for the adjacent brushes 22 and 23, respectively, are relatively arranged in reversely inclined positions so as to be pivotally movable in opposite directions toward and away from the commutator 18. The brush support 27, which is positioned substantially opposite from the adjacent brush supports 25 and 26, is pivotally movable toward and away from the commutator 18 in the same direction as the brush support 25.

Torsion springs 32 mounted on the pivots 29 are arranged to act on the brush supports 25, 26 and 27 so as to yieldably hold the brushes, at the free ends of such supports, in contact engagement with the commutator 18.

For the purpose of maintenance and replacement of the brushes 22, 23 and 24, the housing 16 at the commutator end of the generator 14, is formed with circumferential openings 33 (Figs. 2 and 3) at positions radially opposite from the brush supports. These openings 33 are covered by a so-called dust ring 34, of a generally flat form, split at 35 and provided with laterally extended ears 36 at the split 35. A clamping bolt 50, extended through the ears 36, normally holds the dust ring 34 in a fixed position on the generator housing 16.

The generator structure thus far described is well known and, except for the dust ring 34, forms no part of the present invention.

The brush moving device of this invention includes a pair of extensions 37 and 38 (Figs. 2 and 4) projected longitudinally from the free ends of the brush supports 25 and 26, respectively. The extension 37 is longer than the extension 38 so that its end portion 39 overlies the extension 38. To accomplish a concurrent pivotal movement of the supports 25 and 26 away from the commutator 18, in response to a rotational or rocking movement of the dust or actuating ring member 34 in one direction, a flexible hard twine or wire 41 has one end 42 attached to the free end of the extension 38 and its opposite end secured as at 43 to the actuating ring 34. An intermediate portion 44 of the twine or wire 41 is connected to the free end 39 of the extension 37.

It is seen, therefore, that the twine sections 45 and 46, connected between the extensions 37 and 38, and between the extension 37 and actuating ring 34, respectively, constitute pivoted link connections between such parts. The sections or links 45 and 46 are of relative lengths such that on pivotal movement of the brush support 25 away from the commutator 18, the brush support 26 is also pivotally moved away from the commutator. Further, the link 45 is without tension when the brush 23 is against the commutator, to permit a yieldable engagement of the brush 24 with the commutator.

In turn the link 46 is of a length connected with the actuating ring 34 at a position such that on a rocking or rotational movement of the actuating member in one direction the brush supports 25 and 26 are concurrently pivoted in opposite directions away from the commutator, with the brush support 26 being movable in response to the movement of the brush support 25.

With reference to Fig. 2, and as previously mentioned, the brush support 27 is pivotally movable away from the commutator 18 in the same direction as the brush support 25. To accomplish a movement of the brush 24, at the free end of the brush support 27, away from the commutator 18, concurrently with a movement of the brushes 22 and 23 away from the commutator, a flexible link or connection 47 is connected between the ring or actuating member 34 and the free end of the brush support 27. Thus on movement of the ring member 34 in a counter-clockwise direction, as viewed in Fig. 2, the brush supports 25, 26 and 27 are concurrently moved from their full line positions to their dotted line positions, in which their respective brushes 22, 23 and 24 are out of contact engagement with the commutator 18.

To provide for the rotational rocking movement of the ring or actuating member 34 about the generator housing 16, a coil spring 48 is arranged in compression between the head 49 of the clamping bolt 50, and the upper one of the ears 36. The ring member 34 is thus yieldably maintained about the generator housing 16 in much the same manner as a brake band. The ring 34 is thus readily moved to an adjusted position and then yieldably maintained in an adjusted position by the action of the spring 48.

In order to operate the actuating or ring member 34 from the tractor operator's seat, there is provided a clamp member 55 (Figs. 3 and 5) adapted to be clamped about the hub 49 at the commutator end of the generator housing 16 and formed with a laterally extended pivot or pin 51. A bell crank 52, rockably supported on the pin 51, has one arm 53 extended forwardly from the pin 51. The front or free end of the arm 53 is positioned between the ring ears 36 and formed with an enlarged opening 54 adapted to loosely receive the bolt 50.

The second arm 56, of the bell crank 52, extends upwardly from the pin 51 and has its free end movably connected at 57 with the front end of a control rod 58. The rear end of the control rod 58 (Fig. 1) is movably supported on the tractor, for forward and rearward movement, at a position adjacent to the instrument panel 59 and is provided with a knob or hand grip 61.

Thus by merely gripping the knob 61 the control rod 58 is manipulated in a forward or rearward direction by the tractor operator, to move the brush supports 25, 26 and 27. On a rearward movement of the control rod 58, the bell crank 52 is rocked in a clockwise direction, as viewed in Figs. 1 and 5, to in turn provide for a rotational movement of the actuating member 34 to move the brushes 22, 23 and 24 away from the commutator 18. On a forward movement of the control rod 58, the brushes are returned into engaging positions with the commutator.

In the use of this invention, when the usual ammeter (not shown) on the tractor instrument panel 59 indicates a cut out or reduction of the generator output to the tractor battery, it likewise indicates a charged condition of the battery. The tractor operator then manipulates the control rod 58 to lift the brushes 22, 23 and 24 away from the commutator 18. The generator output is thus positively cut off from the battery so that the generator merely runs idle until a charging of the battery is required. An indication as to whether or not the battery needs charging may be determined by intermittently moving the brushes into commutator engagement and then reading the ammeter.

The modified form of the invention, shown in Fig. 7, is similar in many respects to the invention described in connection with Figs. 2 and 3. Similar numerals of reference will be used, therefore, to designate like parts.

An extension 62 (Fig. 7) for the brush support 25 is formed at its free end with an outwardly projected lateral arm 63. The brush support 26 has an extension 64 of a substantially U-shape and adapted to loosely receive the extension 62 between the legs thereof at a position to the underside of the base section 66 of the U-extension 64.

The extensions 62 and 64 are of relative lengths such that when the brushes 22 and 23 are in contact engagement with the commutator 18, the extension 62 is free, or out of engagement, with the base 66 of the U-extension 64. Thus on pivotal movement of the brush support 25 in a counter-clockwise direction, as viewed in Fig. 7, or away from the commutator 18, the extension 62 slidably engages the base 66 of the U-extension 64. On a continued outward pivotal movement of the brush support 25, the base 66 is slidably moved toward the arm 63 at the free end of the extension 62, whereby to provide for an outward pivotal movement of the brush support 26 away from the commutator 18, in a direction opposite to the pivotal movement of the brush support 25.

This concurrent pivotal movement of the brush supports 25 and 26, and in turn of their respective brushes 22 and 23 away from the commutator 18, is accomplished by means including a connecting or link member 67 movably connected at one end to the arm 63 at the free end of the extension 62, while its opposite end is connected at 68 with the ring or actuating member 34. The link 67 is relatively arranged between the extension 62 and the ring member 34 such that on rotation of the ring member in the direction of pivotal movement of the brush support 25 away from the commutator 18, the brush support 25 is lifted or raised from the commutator. This lifting action of the brush support 25 in turn provides for a concurrent lifting away from the commutator 18 of the brush support 26, through the extensions 62 and 64 in the manner above described. The brush support 27 (not shown in Fig. 7) is concurrently moved with the brush supports 25 and 26 in all ways similar to its movement previously described in connection with Fig. 2.

From the above description it is seen that the invention provides a brush moving device for a generator which is of a simple and compact construction, and efficient in operation to provide for a positive cut off of the generator output to a battery. The actuating member 34 may be manipulated directly at the generator, or by the provision of the bell crank 52 and control rod 58 from a position accessible to the tractor operator.

Although the invention has been described and illustrated with respect to several embodiments thereof, it is to be understood that it is not to be so limited since changes can be made therein which are within the full intended scope of this invention, as defined by the appended claims.

I claim:

1. In a generator including a housing for an armature having a commutator and a pair of supports for commutator brushes mounted within said housing for pivotal movement in opposite directions away from said commutator and yieldably biased toward the commutator to hold said brushes against the commutator, the means for concurrently moving said brushes out of contact engagement with the commutator including an actuating member movably supported on said housing for movement in an arcuate path about said supports, means movably connecting together the free ends of said brush supports such that one of said brush supports is pivotally moved away from said commutator in response to the pivotal movement of the other of said brush supports away from said commutator, and a connecting member connected between said actuating member and said other brush support to provide for the pivotal movement of said other brush support away from said commutator in response to the movement of said actuating member in one direction.

2. In a generator including a housing for an armature having a commutator and a pair of supports for commutator brushes mounted within said housing for pivotal movement in opposite directions away from said commutator and yieldably biased toward said commutator to hold said brushes against the commutator, the means for moving said brushes out of contact engagement with said commutator including an actuating member supported on said housing for movement in an arcuate path concentric with said commutator, longitudinal extensions at the free ends of said brush supports, with the extension on one of said supports having its free end portion adapted for slidable engagement with the other of said extensions, means movably connected between said other extension and actuating member such that on movement of said actuating member in one direction said other extension and the support therefor are moved away from said commutator, whereby said one extension is slidably engaged and moved by said other extension to provide for the concurrent movement of the support therefor away from said commutator, and means for moving said actuating member.

3. In a generator including a housing for an armature having a commutator and a pair of adjacent supports for commutator brushes mounted within said housing for pivotal movement in opposite directions away from said commutator and yieldably biased toward the commutator to hold said brushes against the commutator, the means for moving said brushes out of contact engagement with said commutator including a flat ring member rotatably mounted on the outer periphery of said housing opposite the brushes and concentric with the commutator, a U-shape extension at the free end of a first one of said supports, a longitudinal extension at the free end of the second one of said supports and receivable between the legs of said U-extension such that its outer end is slidably engageable with the base of said U-extension, a connecting member attached to the free end of said longitudinal extension, means connecting said connecting member with said actuating member such that on rotational movement of the actuating member in one direction said second support is pivotally moved away from said commutator, whereby said longitudinal extension slidably engages and moves said U-extension to provide for a concurrent pivotal movement of said first support away from said commutator, and means for manipulating said actuating member.

4. In a generator including a housing for an armature having a commutator and a pair of adjacent supports for commutator brushes mounted within said housing for pivotal movement in opposite directions away from said commutator and yieldably biased toward the commutator to hold said brushes against the commutator, the means for moving said brushes out of contact engagement with said commutator including an actuating member supported on said housing opposite said supports and movable in an arcuate path concentric with said commutator, said supports, when the brushes are in engagement with the commutator, being reversely inclined with their free ends adjacent to each other, longitudinal extensions at the free ends of said supports, with the extension on a first one of said supports being longer than the extension on the second one of said supports so as to project over said shorter extension, a first link connected between said actuating member and the free end of the longer extension such that on movement of said actuating member in one direction said first support is pivotally moved away from said commutator, a second link connected between the free ends of said extensions, whereby said second support is pivotally moved away from said commutator concurrently with said first support, and means for manipulating said actuating member.

CLARK E. STROBURG.

REFERENCES CITED

The following references are of record in the file of this patent:

UNITED STATES PATENTS

| Number | Name | Date |
|---|---|---|
| 1,424,326 | Trostel | Aug. 1, 1922 |
| 1,633,891 | Fynn | June 28, 1927 |
| 1,760,874 | Lansing | June 3, 1930 |
| 1,985,395 | Anderson | Dec. 25, 1934 |

FOREIGN PATENTS

| Number | Country | Date |
|---|---|---|
| 113,239 | Switzerland | Jan. 2, 1926 |